J. RAU.
PROCESS OF MAKING HOLLOW GLASSWARE.
APPLICATION FILED FEB. 23, 1912.

1,061,405.

Patented May 13, 1913.
2 SHEETS—SHEET 1.

WITNESSES:

INVENTOR.
John Rau
BY
ATTORNEY.

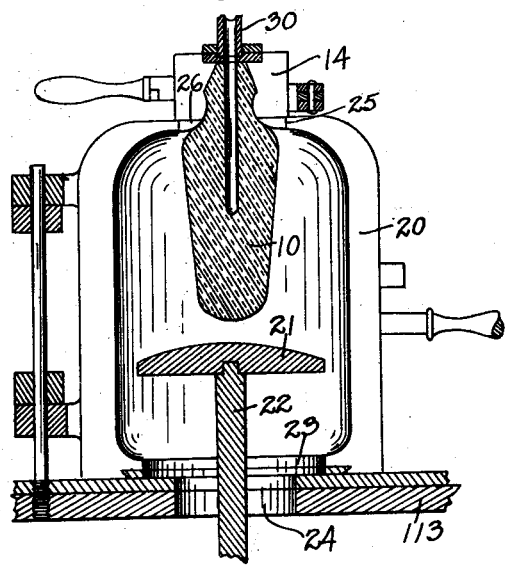
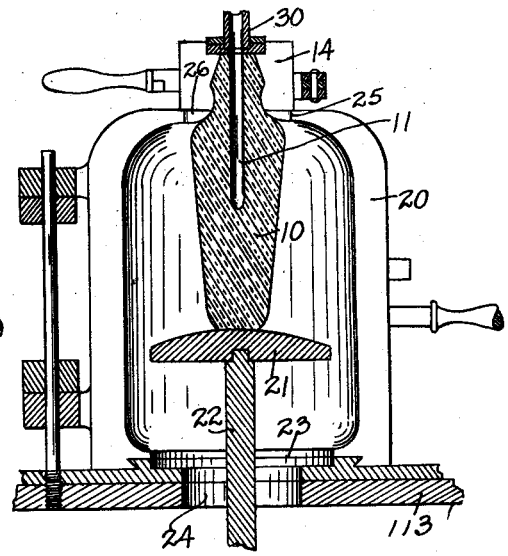
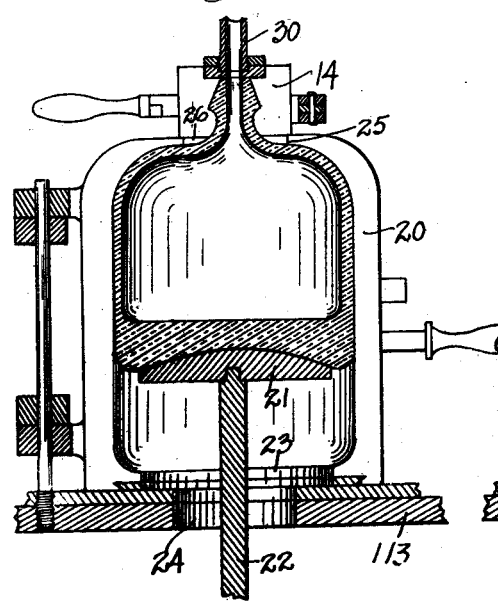
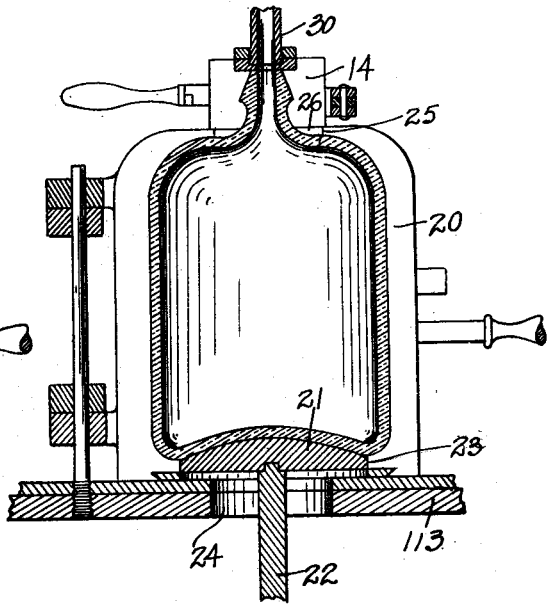

UNITED STATES PATENT OFFICE.

JOHN RAU, OF INDIANAPOLIS, INDIANA.

PROCESS OF MAKING HOLLOW GLASSWARE.

1,061,405.   Specification of Letters Patent.   Patented May 13, 1913.

Application filed February 23, 1912. Serial No. 679,451.

*To all whom it may concern:*

Be it known that I, JOHN RAU, a citizen of the United States, residing at Indianapolis, county of Marion, and State of Indiana, have invented a certain useful Process for Making Hollow Glassware; and I do hereby declare that the following is a full, clear, and exact description thereof, reference being had to the accompanying drawings.

The object of this process is the production, by blowing, of very large hollow glass ware, such as bottles, jars, demijohns and carboys. With this process said articles may be made of one, five, ten or fifteen gallons' capacity, as desired. Said process greatly cheapens and facilitates the manufacture of such articles. The large capacity of the article being made, increases the difficulties to be overcome by the process of forming the same.

The nature of the process and its various steps whereby said object is accomplished will appear from the accompanying drawings and the following description and claims.

Figure 1:
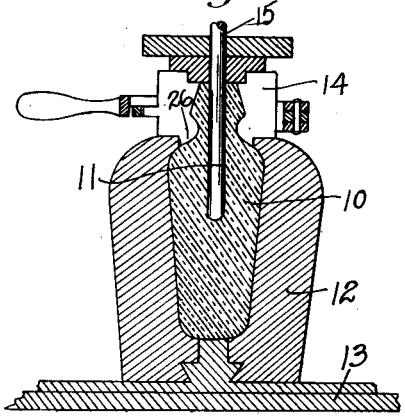
Figure 2:
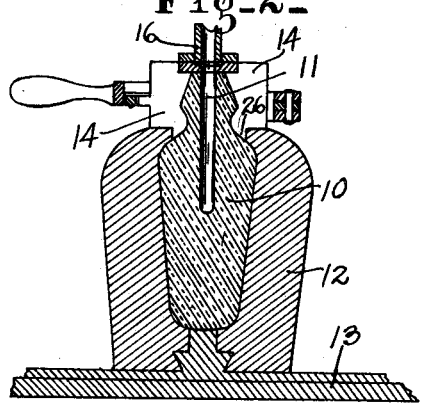
Figure 3:
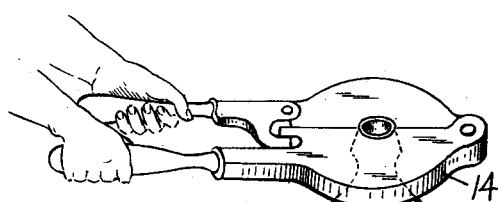
Figure 4:
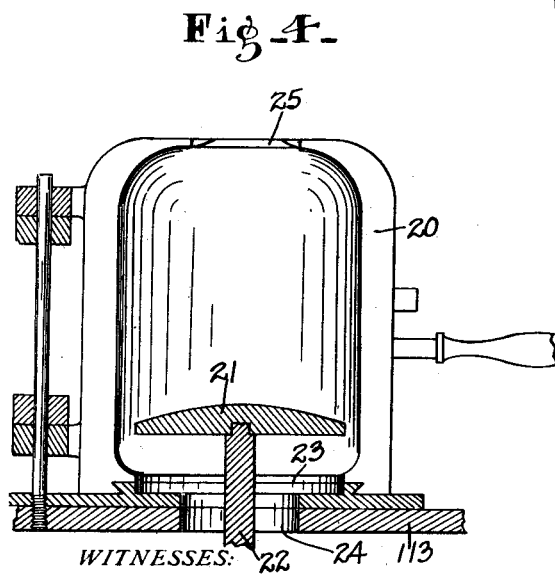
Figure 5:
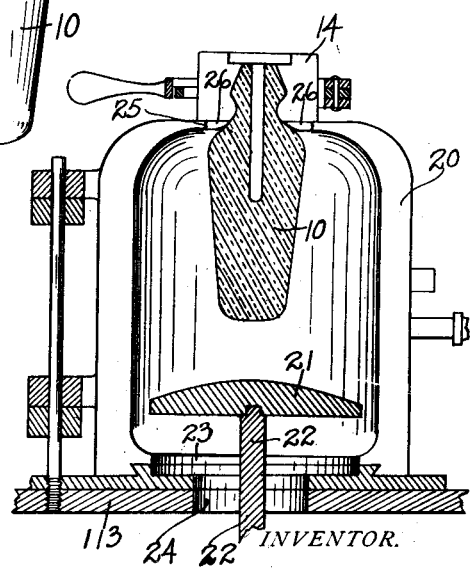

In the drawings, Figure 1 is a central vertical section through a press mold and associated parts, showing the blank formed by the plunger. Fig. 2 is the same, showing means for introducing air into the blow opening of the blank for maintaining the blank without change while being removed. Fig. 3 is a perspective view of the lift-over transferring the blank. Fig. 4 is a central vertical section through the blow mold and associated parts with a movable bottom in an elevated position. Fig. 5 is the same, showing the glass blank inserted in the blow mold. Fig. 6 is the same showing the mold bottom moved up toward the blank to its limit of movement. Fig. 7 is the same showing the lower part of the blank after it has sagged down by gravity into contact with the mold bottom and with the blowing means in place. Fig. 8 is the same with the article partly blown. Fig. 9 is the same with the article completely blown.

In the first place a gather of glass is placed in a press mold 12 on a table 13 for the purpose of forming a blank 10 with a blow opening 11 in the upper end thereof. A lift-over 14 is placed upon the press mold and a plunger 15 is inserted into the upper end of the gather of glass. This presses the glass blank in the press mold into definite shape and provides the blow opening 11 and forces the upper part of the glass against the walls of the lift-over and shapes and finishes the neck or top of the article. In the second place air is introduced into the blow opening 11 of the glass blank 10 while it is still in the press mold. This may be done from the mouth of the operator or by pneumatic machinery which forces air into said blank under pressure through what may here be called a blow head 16 which is placed upon the lift-over 14. The sort of means or mode of furnishing the air is immaterial so long as air is introduced into the blow opening 11 under slight pressure. That prevents the destruction of said opening by the collapse of the glass before it is chilled and also partly chills the inner surface of the glass to prevent collapse. In other words, this air performs two functions, one theoretically following the other. The air pressure holds back the wall of the glass after the plunger is removed and prevents it from collapsing and then it will chill the inner surface of the glass. The air should be introduced into the blank in the press mold as soon as possible after the blank has been pressed and the blow opening formed therein. This may be done before the plunger is withdrawn, but it is preferably done immediately after the plunger is withdrawn, for otherwise there is danger of the blow opening being destroyed by the collapse of the glass.

In the mechanism herein shown for the purpose of carrying out this operation, the blow mold 20 has a movable bottom 21 carried on a rod 22 which extends down through an opening 23 in the bottom of the blow mold and an opening 24 in the table 13 and may be vertically moved or manipulated by hand, by mechanical means or by air or fluid. The mold also has an opening 25 in its upper end large enough to receive the shoulder 26 extending down from the bottom of the lift-over and centering the same in the well known manner. The blow mold is considerably larger in diameter than the blank 10 and the bottom 21 is larger than the opening 25 at the upper end of the blow mold. In the idle position, the bottom 21 is at its lowest limit of movement in the opening 23 in the bottom of the blow mold and resting upon the table 13 and the opening 24 therethrough. In the next step of the process the bottom 21 is elevated in the blow mold, say about one-fourth of the distance from the lower end thereof. In the next place the blank thus formed is transferred, either by hand, as shown in Fig. 3, or by mechanical means, from the press mold to a blow mold 20. The blank is suspended from the lift-over 14, the lift-over holding it by the neck thereof, and is inserted into the blow mold, as shown in Fig. 5, with the lower end thereof some distance above the mold bottom. In the next place the movable bottom 21 is moved farther upward toward the glass blank, as shown in Fig. 6. As I have practised the invention heretofore, this upward movement of the mold bottom from the extreme lower position of the mold bottom to the upward limit of movement thereof, as shown in Fig. 6, has been a continuous upward movement, although this is not necessary. The blank has been inserted and thereafter the mold bottom further elevated to its upward limit, but its upward limit of movement should preferably be below the lower end of the blank for the blank should not strike the bottom while the blank is being inserted in the mold. Otherwise the blank might be destroyed or disarranged. In the next place the mechanism is held *in statu quo* long enough for the blank to sag down by gravity into engagement with the central upper surface of the movable mold bottom. As the lower half of the blank is highly heated, it takes but a very short time for it to sag down from the position shown in Fig. 6 to that shown in Fig. 7. This is by far the better way to carry out this part of the process. That is, it is better to let the blank sag down until it meets the mold bottom rather than to move the mold bottom up against the blank for the latter might move too far or otherwise disarrange or destroy the blank, whereas if the contact is brought about by the mere elongation of the lower part of the blank due to gravity, such movement will stop automatically as soon as the blank comes down upon the mold bottom, for all that is needed to stop such elongated movement is the slight resistance of the mold bottom. Hence it is better for the mold bottom to be stationary at the time that this contact occurs. While the operator or workman is waiting until the glass blank sags down into contact with the top of the mold bottom, he can and probably should be placing the blow head 30 or other blowing means in position upon the lift-over on the blow mold preparatory to blowing the article. This blowing may be done by the workman or by machinery, as desired. The blowing should not precede or begin before the blank touches the mold bottom, for it is necessary that this contact between the blank and mold bottom precede the blowing in order that the blank may be properly centered and guided during the blowing. Otherwise there might be an uneven blowing or distribution of the glass. After the glass blank has come in contact with the mold bottom, air is introduced or blown into the blow opening 11 of the glass blank and during the first half of the blowing operation, the mold bottom is held practically stationary so that the article will be blown laterally until the glass comes in contact with the interior wall of the mold, as shown in Fig. 8. This forms the upper part of the body of the glass article completely and leaves a thick body of glass at the lower end resting upon the mold bottom. In the last half of the blowing operation, the mold bottom 21 is moved downwardly and in its downward movement, it guides and holds the lower part of the article being blown so that the lower part of the article will be perfectly formed. This downward movement of the mold bottom should be very quick and rapid and preferably with accelerated downward movement or speed so that the mold bottom will not in any degree resist the downward movement of the glass in the bottom of the blank or article. In fact, to some degree the mold bottom facilitates the downward movement of the glass as it guides and holds the same and this coöperation with the air pressure within the glass article, causes the perfect formation of the lower half of the article, as shown in Fig. 9. At all times when the mold bottom 21 is in contact with the blank or glass article, it should be yieldingly supported so that it will, in emergency, according to the volume of glass, yield slightly and thus avoid any ill results from irregular or positive action of any of the parts. However, the limit of upward movement of the movable bottom should have a predetermined relation to the length and size of the blank which is to be put into the blow mold in order that they may come together at the proper time and under the proper conditions. The blank must not be allowed to elongate very long or to any great 120 degree before it touches the mold bottom, nor, as has been explained, should the mold bottom be pushed up into the glass blank.

With the foregoing operation, I have been enabled to make very large glass bottles and jars, such as those of ten gallons' capacity with an even distribution of the glass and without many malformations of the articles or undue loss. This result is due to several features of the process, the formation of the press blank of predetermined dimensions, the production in said press blank of a blow opening, predetermined upward movement of the movable bottom in the blow mold according to the length and size of the glass blank, the proper meeting of the lower end of the glass blank with the center of the movable mold bottom, the yielding resistance of the movable mold bottom during the first half of the blowing so as to spread the upper end of the blank, as shown in Fig. 8, and then the ready downward movement of the mold bottom immediately thereafter, so as to simultaneously support and guide the volume of glass at the bottom of the blank and yet not resist its downward movement under the action of the incoming air.

I claim as my invention:

1. In the process of making hollow glass ware, pressing a glass blank in a press mold and forming a blow opening centrally in the neck end thereof, introducing air under pressure into said blow opening while the blank is in said mold for maintaining said blow opening and chilling its surface without enlarging the blank, replacing the press mold with a separate blow mold and subsequently blowing said blank into a finished article.

2. In the process of making hollow glass ware, pressing a glass blank and forming a blow opening centrally in the neck end thereof, introducing air under pressure into said blow opening for maintaining said blow opening and chilling its surface without enlarging the blank, removing said glass blank from the position where it was formed, and subsequently blowing said blank into a finished article.

3. In the process of making hollow glass ware, pressing a glass blank with a central blow opening in the neck end thereof, introducing air into said blank for blowing the same, resisting the longitudinal expansion of said blank during the first part of the blowing thereof so that it will laterally expand to form the upper part of the article, and guiding the lower end of said blank during the latter part of the blowing thereof.

4. In the process of making hollow glass ware, pressing a glass blank with a central blow opening in the neck end thereof, introducing air into said blank for blowing the same, resisting the longitudinal expansion of said blank during the first part of the blowing thereof so that it will laterally expand to form the upper part of the article, and yieldingly holding the lower end of said blank during the latter part of the blowing thereof.

5. In the process of making hollow glass ware, pressing a glass blank and forming a blow opening centrally in the neck end thereof, introducing air under pressure into said blow opening for maintaining said blow opening and chilling its surface without enlarging the blank, transferring the blank to another position, introducing air into the blank for blowing the same, and guiding the lower end of the blank while it is being blown.

6. In the process of making hollow glass ware, pressing a glass blank and forming a blow opening centrally in the neck end thereof, introducing air under pressure into said blow opening for maintaining said blow opening and chilling its surface without enlarging the blank, transferring the blank to another position, introducing air into the blank for blowing the same, and yieldingly supporting the lower end of said blank while it is being blown.

7. In the process of making hollow glass ware, pressing a glass blank and forming a blow opening centrally in the neck end thereof, introducing air under pressure into said blow opening for maintaining said blow opening and chilling its surface without enlarging the blank, transferring the blank to another position, introducing air into the blank for blowing the same, supporting the lower end of the blank, yieldingly holding from movement the lower end of said blank during the first part of the blowing thereof, and yieldingly withdrawing the lower end of said blank during the latter part thereof.

8. In the process of making hollow glass ware, inserting a glass blank downwardly into the upper end of the blow mold which is of larger diameter than the blank, introducing air into the blank for blowing the same, supporting the lower end of the blank from vertical expansion during the first part of the blowing thereof, and yieldingly supporting the same during the last part of the blowing thereof.

9. In the process of making hollow glass ware, pressing a glass blank with a blow opening in the upper end thereof, inserting said blank into the upper end of a blow mold, supporting the lower end of the blank within the mold, introducing air into the blank for blowing the same in said mold, and after the blank has been expanded laterally to the side wall of the mold, lowering the support for the lower end of the blank until it reaches the bottom of the mold.

10. In the process of making hollow glass ware, forming a glass blank of predetermined size, inserting and supporting the same in the upper end of a blow mold, elevating a movable bottom in said mold so that it will support the lower end of the blank, introducing air into said blank for blowing it, holding the movable bottom in its elevated position until the upper part of the article has been fully blown, and then lowering the movable bottom while the lower part of the article is being blown.

In witness whereof, I have hereunto affixed my signature in the presence of the witnesses herein named.

JOHN RAU.

Witnesses:
G. H. BOINK,
O. M. MCLAUGHLIN.